E. J. VAUDREUIL.
SEPARATOR AND GRADER.
APPLICATION FILED MAY 8, 1914.

1,165,469.   Patented Dec. 28, 1915.

Witnesses:
Casanave Young
May Downey

Inventor
Edward J. Vaudreuil
By Oliphant & Young
Attorneys dd
UNITED STATES PATENT OFFICE.

EDWARD J. VAUDREUIL, OF VAUDREUIL, WISCONSIN.

SEPARATOR AND GRADER.

1,165,469.  Specification of Letters Patent.  Patented Dec. 28, 1915.

Application filed May 8, 1914. Serial No. 837,102.

*To all whom it may concern:*

Be it known that I, EDWARD J. VAUDREUIL, a citizen of the United States, and resident of Vaudreuil, in the county of Jackson and State of Wisconsin, have invented certain new and useful Improvements in Separators and Graders; and I do hereby declare that the following is a full, clear, and exact description thereof.

My invention has for its object to provide a simple, economical and accurate screening mechanism especially designed for separating peas or the like into different grades for canning purposes, its construction and arrangement being such that a series of rotatory screening drums are provided having successively reduced mesh from the first screen to the last of the series, whereby the fine grades of peas will be initially separated from the coarsest grade at the feed end of the device as, for example, a No. 6 or coarse grade of peas will travel throughout the entire length of the first screen and the next grade No. 5 will, in a like manner travel throughout the entire length of the second screen, and so on throughout the series.

Heretofore the screening or grading has been effected by a reverse arrangement of the screen mesh whereby the peas are first fed to a fine grade of screen and travel successively over a series of screen sections increasing in mesh. Practice has demonstrated that, in this arrangement, the coarser grades of peas in their travel, will cause the finer grades to be swept forward due to the motion of the coarser peas and also to the fact that the said coarser peas will fill the interstices of the fine mesh more or less and prevent the escape of the finer grade. Hence the several grades are separated imperfectly as the smaller peas will be mixed with the peas of the coarser grades to thus defeat the object of the screening method, as, for example, a portion of the No. 1 grade will be forced upon No. 2 screen and may be separated with the No. 2 grade, and so on throughout the series. My improved separating and grading device will effectually overcome the objectionable features mentioned.

With the above objects in view the invention consists in certain peculiarities of construction and combination of parts as set forth hereinafter with reference to the accompanying drawings and subsequently claimed.

Figure 1:
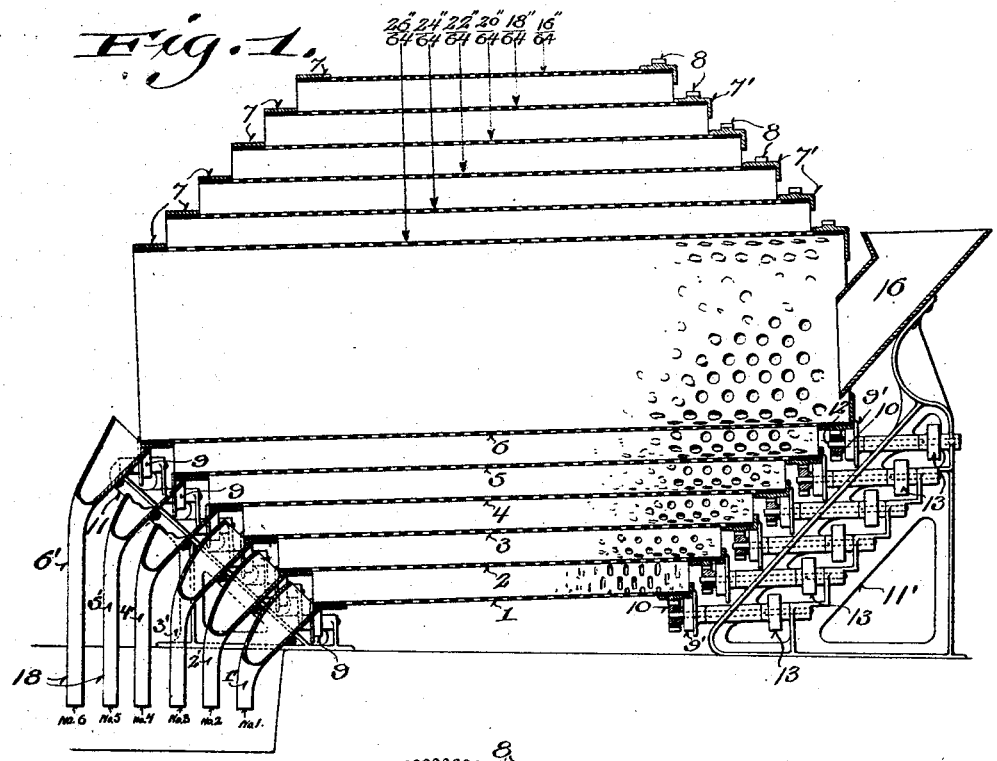
Figure 2:
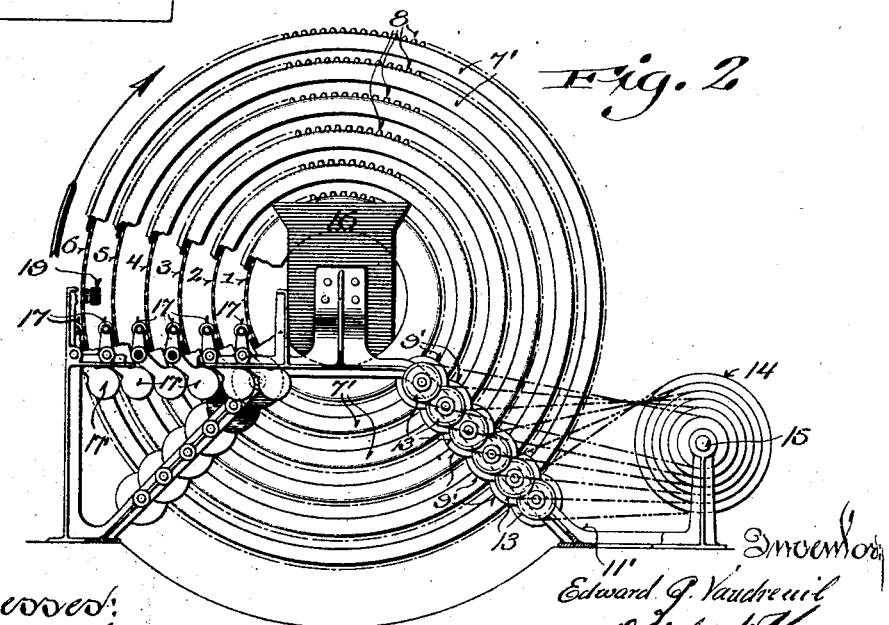

In the drawings Figure 1 represents a longitudinal sectional view through a screen mechanism embodying the features of my invention, and Fig. 2, an end view of the same with parts broken away and parts in section to more clearly illustrate certain details of construction.

Referring by characters to the drawings, 1 represents an outer screen drum, 6 an inner screen drum constituting a core and 2 to 5 inclusive intermediate screen drums, the series, as shown, being in nested relations. The body of No. 1 screen, for example, is composed of 16/64 standard mesh; the next 18/64, 20/64, 22/64, 24/64, and the coarse screen 26/64. Hence it is apparent that the coarse screen constitutes a receiver and that the grade is successively refined from said screen to the outer drum 1. The body of the drums are preferably formed from apertured sheet metal as shown, and the outer screen drum 1 is formed with a mesh of fine elongated apertures, as shown, this screen serving to separate the culls from the No. 1 grade of peas and the grades, for example, are ordinarily designated in canning from No. 1 to No. 6, which latter number is the largest size peas of the several grades, while the No. 1 is the smallest size used in canning.

The outer or culling drum 1 is the shortest of the series and the drums are progressively lengthened to present exposed ends as shown, which ends are provided with track-rings 7, 7', fitted about their exposed opposite ends, the track-rings 7' at the feed end of the device being provided with teeth 8, whereby the drums are independently driven. Each drum is supported by sets of rollers 9, 9', which rollers engage the track-rings and one set of the rollers 9', at the feed end of the machine, is associated with gear-wheels 10, which gear-wheels mesh with the teeth 8 of the track-rings, the said teeth constituting circular racks. The several series of rollers 9 which support the delivery ends of the drums are mounted in a suitable bracket 11 and the gear connected rollers 9' are mounted upon spindles 12, which spindles are journaled in boxes that form part of a supporting bracket 11'. These spindles have also secured thereto drive-wheels 13, which drive-wheels are in belt connection with a stepped pulley 14 that is mounted upon a counter-shaft 15, the said counter-shaft being journaled in suitable bearings with which the bracket 11' is provided. The stepped pulley is so proportioned with relation to the drive-wheels 13 as to cause each of the drums to revolve at the same peripheral speed in the direction as indicated by the arrows in Fig. 2, as, for example, the smaller step or face of the pulley 14 is in belt connection with the core drum and so on throughout the series the steps of the pulley are increased proportionately, whereby the outer or cull drum is driven by a belt connection to the face of the pulley having the greatest diameter.

The feed end of the core drum has projecting therein a feed hopper 16, which hopper is suitably supported from the bracket 11' and the discharge end of the core drum 6 is provided with a delivery hopper 6', there being similar hoppers 5', 4', 3', 2', 1', associated with the discharge ends of the remaining series of the drums.

As best shown in Fig. 2, each drum is provided with a longitudinally disposed yieldable roll 17, which roll is journaled between bell-crank arms 18 that are mounted upon the brackets 11, 11'; the free ends of the bell-cranks being provided with weights 17, whereby the rolls are held in yielding contact with the outer surfaces of their respective drums. This device is an important feature of my invention and serves to press or force peas which have partly entered the interstices of the drum mesh clear of said mesh, whereby the dislodged peas will be caused to drop backward toward the bottom of the drums, it being understood that the clearing rolls are positioned upon the climbing sides of the drums as indicated by the arrow. While I have shown rollers for effecting this cleaning operation, it is obvious that brushes or other yielding devices may be substituted for said rollers without departing from the spirit of my invention.

The outer or cull drum 1 of the series is provided with a cleaning brush 19, which brush extends longitudinally of the drum and is supported by the brackets. The tufts of the brush engage the inner surface of the screening drum 1 and serve to brush out or clear the interstices of said drum from chaff or culls which will result through separation of the several preceding grades of peas.

From the foregoing description it is obvious that mixed peas fed into the core drum will drop through said drum with the exception of the coarsest grade, which grade will be collected in the delivery hopper 6'. The next coarsest grade will be separated from the four remaining grades as the mass of peas travel through the drum 5 and so on throughout the series. Hence it is obvious that the finest grade and culls will be finally deposited into the outer drum 1 and said culls being separated from the final grade, the latter will be discharged into the associated collecting hopper 1', as indicated. It is apparent that, by this system of grading as the peas travel from end to end of the first drum, all grades below the No. 6, which is the largest grade, will be delivered into the second screen before the batch of peas has traveled but a small distance through the length of the drum and hence in the same manner all grades will be accurately gaged as the peas are successively dropped through and graded by the remainder of the drum series.

I claim:

1. A separator and grader comprising a series of rotary nested drums, a toothed ring secured to the end of each drum, means for supporting the individual drums, and an independent driving gear connection for each of the rings.

2. A separator and grader comprising a series of rotary nested drums composed of porous material, a pair of bell-cranks associated with the outer surface of each drum exclusive of the outer drum, a roller carried by each pair of bell-cranks, and a brush mechanism for engagement with the inner surface of the outer drum of the series.

In testimony that I claim the foregoing I have hereunto set my hand at Milwaukee in the county of Milwaukee and State of Wisconsin in the presence of two witnesses.

EDWARD J. VAUDREUIL.

Witnesses:
   Geo. W. Young,
   M. E. Downey.